United States Patent
Saha

(10) Patent No.: US 10,913,441 B2
(45) Date of Patent: Feb. 9, 2021

(54) INTEGRATED POWERTRAIN CONTROL OF ENGINE AND TRANSMISSION

(71) Applicant: Cummins, Inc., Columbus, IN (US)

(72) Inventor: Rohit Saha, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 16/954,636

(22) PCT Filed: Dec. 17, 2018

(86) PCT No.: PCT/US2018/066031
§ 371 (c)(1),
(2) Date: Jun. 17, 2020

(87) PCT Pub. No.: WO2019/126051
PCT Pub. Date: Jun. 27, 2019

(65) Prior Publication Data
US 2020/0317182 A1  Oct. 8, 2020

Related U.S. Application Data

(60) Provisional application No. 62/607,178, filed on Dec. 18, 2017.

(51) Int. Cl.
*B60W 10/06* (2006.01)
*B60W 10/101* (2012.01)
(Continued)

(52) U.S. Cl.
CPC .......... *B60W 10/04* (2013.01); *B60W 10/101* (2013.01); *B60W 30/188* (2013.01);
(Continued)

(58) Field of Classification Search
CPC .... B60W 10/06; B60W 10/101; B60W 10/30; B60W 30/1886; B60W 30/1888;
(Continued)

(56) References Cited

U.S. PATENT DOCUMENTS 8,162,618 B2  4/2012  Nakamura et al.
8,374,755 B2  2/2013  Lin et al.
(Continued)

FOREIGN PATENT DOCUMENTS

WO   WO-2009/145706   12/2009

OTHER PUBLICATIONS

International Search Report and Written Opinion for International Application No. PCT/US2018/066031, dated Mar. 11, 2019, 9 pages.

*Primary Examiner* — Edwin A Young
(74) *Attorney, Agent, or Firm* — Foley & Lardner LLP

(57) ABSTRACT

Systems and apparatuses of a vehicle include an engine control circuit structured to control an engine speed, a transmission control circuit structured to control a transmission, an implement control circuit structured to control an implement, and a processing circuit structured to receive a travel signal indicative of a travel mode for the vehicle, or an implement signal indicative of an implement mode for the vehicle. In response to operating in the travel mode, the transmission control circuit determines the engine speed and the implement control circuit limits an implement torque to maintain the engine speed. In response to operating in the implement mode, the engine control circuit determines the engine speed and the transmission control circuit limits a propulsion torque to maintain the engine speed.

20 Claims, 6 Drawing Sheets

(51) Int. Cl.
*B60W 10/04* (2006.01)
*B60W 30/188* (2012.01)
*E02F 9/20* (2006.01)

(52) U.S. Cl.
CPC .......... *E02F 9/2012* (2013.01); *E02F 9/2033* (2013.01); *E02F 9/2066* (2013.01); *E02F 9/2079* (2013.01); *B60W 2300/17* (2013.01); *B60W 2510/0657* (2013.01); *B60W 2540/10* (2013.01); *B60W 2710/0644* (2013.01)

(58) Field of Classification Search
CPC .......... B60W 50/082; B60W 2300/17; B60W 2510/0638; B60W 2710/0666; B60W 2710/105; B60W 2710/305; B60W 2710/0644; B60W 2720/40
See application file for complete search history.

(56) References Cited

U.S. PATENT DOCUMENTS

| | | |
|---|---|---|
| 8,862,348 B2 | 10/2014 | Morselli et al. |
| 9,126,598 B2 | 9/2015 | Hindman et al. |
| 9,211,808 B2 | 12/2015 | Young |
| 9,333,858 B2 | 5/2016 | Huber et al. |
| 2011/0041802 A1 | 2/2011 | Kar et al. |
| 2015/0008054 A1* | 1/2015 | Hoshino ............... E02F 9/2075 180/65.26 |
| 2016/0237653 A1 | 8/2016 | Tada et al. |
| 2017/0088115 A1* | 3/2017 | Kaneko ................ B60W 20/10 |
| 2018/0338059 A1* | 11/2018 | Ohigashi ................ F02D 11/10 |

* cited by examiner

INTEGRATED POWERTRAIN CONTROL OF ENGINE AND TRANSMISSION

RELATED APPLICATIONS

This application claims the benefit of and priority to U.S. Provisional Patent Application No. 62/607,178, entitled "Integrated Powertrain Control of Engine and Transmission," filed on Dec. 18, 2017, which is incorporated herein by reference in its entirety.

TECHNICAL FIELD

The present disclosure relates to powertrain control of a vehicle. More particularly, the present disclosure relates to systems and methods for controlling a transmission and an implement of a vehicle.

BACKGROUND

Off-highway vehicles can include continuously variable transmissions allowing the vehicle to be operated at a number of ground speeds while running an engine at a constant speed. The constant speed of the engine can be advantageous to fuel efficiency of the vehicle. In some situations, a constant engine speed leads to a lower performance of implements of the vehicle than is desirable.

SUMMARY

One embodiment relates to an apparatus of a vehicle. The apparatus includes an engine control circuit structured to control an engine speed; a transmission control circuit structured to control an operating parameter of a transmission; an implement control circuit structured to control an implement; and a processing circuit structured to receive one of a travel signal indicative of a travel mode for the vehicle and an implement signal indicative of an implement mode for the vehicle. In response to receiving the travel signal indicative of operating in the travel mode, the transmission control circuit is structured to determine the engine speed and the implement control circuit limits an implement torque to maintain the engine speed. In response to receiving the implement signal indicative of operating in the implement mode, the engine control circuit is structured to determine the engine speed and the transmission control circuit limits a propulsion torque to maintain the engine speed.

Another embodiment relates to an apparatus. The apparatus includes a processing circuit comprising at least one processor coupled to at least one non-transitory memory device. The processing circuit is structured to: determine a torque reserve; receive one of a travel signal indicative of a travel mode for the vehicle and an implement signal indicative of an implement mode for the vehicle; prioritize propulsion torque over implement torque when the travel signal is received by limiting implement torque when the torque reserve is less than or equal to a predetermined threshold; and prioritize implement torque over propulsion torque when the implement signal is received by limiting propulsion torque when the torque reserve is less than or equal to an implement torque predetermined threshold.

Still another embodiment relates to a method. The method includes determining a total propulsion torque estimate; determining a hydraulic torque estimate; determining a total demand torque based at least in part on the total propulsion torque estimate and the hydraulic torque estimate; determining a torque reserve; receiving a travel signal indicative of a travel mode for the vehicle; receiving an implement signal indicative of an implement mode for the vehicle; prioritizing propulsion torque over implement torque when the travel signal is received by limiting implement torque when the torque reserve is less than or equal to a travel predetermined threshold; prioritize implement torque over propulsion torque when the implement signal is received by limiting propulsion torque when the torque reserve is less than or equal to an implement predetermined threshold; decreasing an engine speed when the torque demand is greater than or equal to the minimum fuel consumption torque and the travel signal has been received; and decreasing a requested pump and motor displacement of a working hydraulic system when the torque demand is greater than or equal to the minimum fuel consumption torque and the implement signal has been received.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for powertrain controls of an engine and a transmission. The various concepts introduced above and discussed in greater detail below may be implemented in any number of ways, as the concepts described are not limited to any particular manner of implementation. Examples of specific implementations and applications are provided primarily for illustrative purposes.

Referring to the figures generally, the various embodiments disclosed herein relate to systems, apparatuses, and methods for providing prioritized operation during a travel mode and an implement mode. In the travel mode, engine speed is determined by a transmission controller and the torque that is available to an implement (e.g., a front end loader and associated hydraulic system) is limited. In the implement mode, engine speed is determined by an engine controller and the torque that is available for propelling or driving the vehicle (e.g., the torque consumed by a motor and pump of a continuously variable transmission (CVT)) is limited. In some embodiments, the system allows for an engine control during travel that provides improved fuel efficiency and limits the power available to implements, and implement control during use in the implement mode that gives the user more traditional control (e.g., pressing on the accelerator pedal will directly increase the power available to the implement).

As used within this document, the travel mode refers to a mode of operation that limits torque provided to an implement and engine speed is determined by a transmission control circuit. As used within this document, the implement mode refers to a mode of operation that limits torque provided to a transmission and engine speed is determined by an engine control circuit in response to user input. Within the context of this application, "propulsion torque" refers to torque provided by an engine that is used to move a vehicle over the ground, and "implement torque" refers to torque provide by the engine to any implement of the vehicle (e.g., a front end loader).

Figure 1:
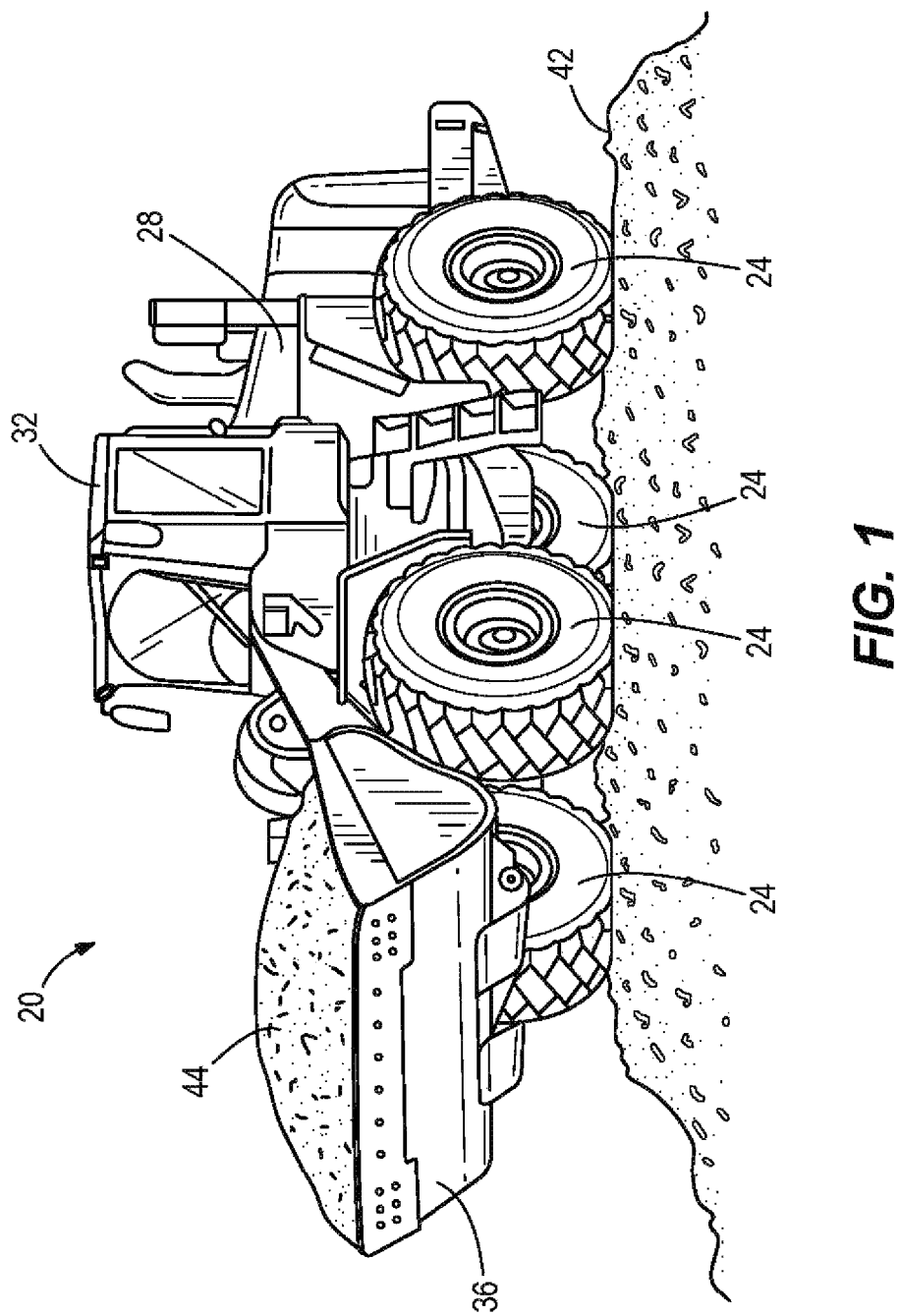
FIG. 1 is a perspective view of a vehicle, according to an example embodiment.

As shown in FIG. 1, a vehicle in the form of a wheel loader 20 generally includes four wheels 24, an engine 28, a cab 32, and an implement in the form of a front end loader 36. The wheel loader 20 moves over the ground 40 and the front end loader 36 manipulates material 44. In some constructions, the vehicle is another off-highway vehicle that includes an implement for manipulating material. For example, the vehicle may include tracks, a drill, a rake, a screen and/or conveyor, a bucket, or another implement, as desired. Within the context of this document, the term implement refers to any tool or system that consumes power for an action other than propelling the vehicle for movement over the ground. For example, the term implement may include, but is not limited to, a drill/auger, a rake, a conveyor, and/or a bucket.

Figure 2:
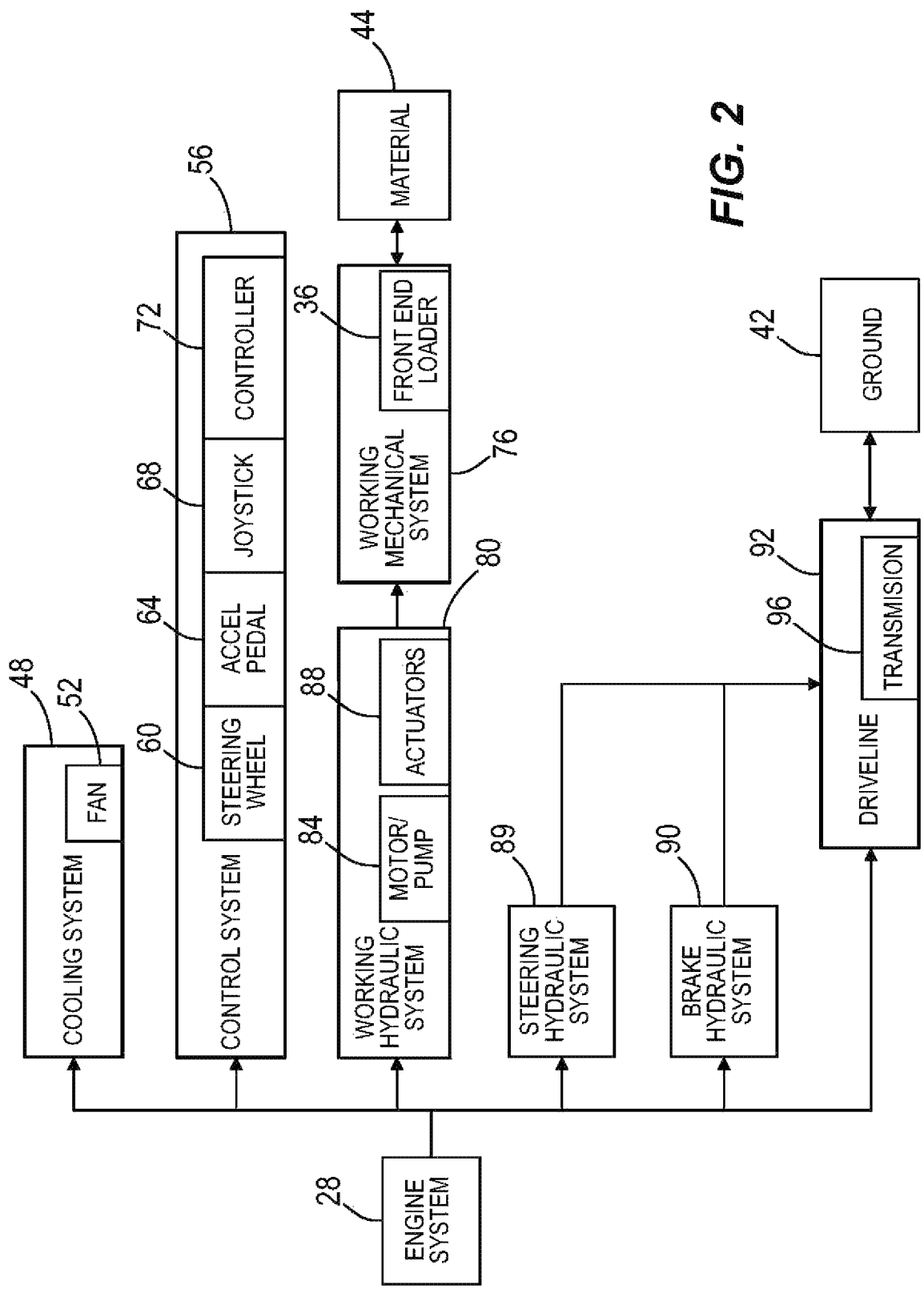
FIG. 2 is a schematic of the functional systems of the vehicle of FIG. 1, according to an example embodiment.

A shown in FIG. 2, the engine 28 is an internal combustion engine (e.g., diesel or gasoline) and provides a mechanical power output. The engine 28 operates at an engine speed and provides an engine torque. A cooling system 48 is coupled to the engine 28 and provides heat exchange for the components of the wheel loader 20. The cooling system 48 includes a fan 52 that can be driven by the engine 28 that moves air through the cooling system 48. A control system 56 is positioned within the cab 32 of the wheel loader 20 and includes user interface devices including a steering wheel 60, an accelerator pedal 64, and a joystick 68. The control system 56 also includes a controller 72 that communicates with the user interface devices and the other components of the vehicle 20 to enact control. A working mechanical system 76 includes the front end loader 36 and the associated linkages. In some embodiments, the working mechanical system 76 may include mechanically powered take-offs, other components, or other implements (e.g., a drill/auger, a drag, a backhoe, a jaw). A working hydraulic system 80 includes a motor/pump 84 and hydraulic actuators 88 that are coupled to the working mechanical system 76 to enact action to the working mechanical system 76. The working hydraulic system 80 can be arranged to operate other components of the working mechanical system 76. For example, if the working mechanical system 76 includes an auger or another implement, the working hydraulic system 80 provides power to the implement. In the example of FIG. 2, the implement is coupled to the working mechanical system 75 and the working hydraulic system 80 together, or to portions of the working mechanical system 76 and/or the working hydraulic system 80. Additionally, as represented in FIG. 2, the working hydraulic system 80 includes a steering hydraulic system 89 and a brake hydraulic system 90. The steering hydraulic system 89 and the brake hydraulic system 90 are separately controlled but considered a part of the overall working hydraulic system 80 for purposes of this document. Further, the working hydraulic system 80 may include other hydraulic components and systems that require hydraulic power or flow. A driveline 92 includes a transmission 96 that receives power from the engine 28 and provides rotational power to the four wheels 24. In some embodiments, the transmission 96 is a continuously variable transmission (CVT) that includes a hydraulic motor/pump.

A typical loader drive cycle for the wheel loader 20 includes five phases. The first phase is unloaded (e.g., no material in the front end loader 36) and involves driving or propelling the wheel loader 20 to approach a pile of material 44 or other material 44 location or area. The second phase includes digging the material 44 and involves manipulating the working mechanical system 76 via the working hydraulic system 80 and propelling the wheel loader 20 with the driveline 92. The third phase is loaded (e.g., the front end loader 36 is filled with material) and involves reversing or propelling the wheel loader 20 away from the pile of material 44 or other material 44 location or area. The fourth phase including approaching a dump site (e.g., a truck, a second location or area, a train car) and involves raising the front end loader 36 with the working mechanical system 76 via the working hydraulic system 80, and propelling the wheel loader 20 forward. The fifth phase includes stopping the wheel loader 20 an appropriate distance from the dump site, manipulating the working mechanical system 76 via the working hydraulic system 80 to dump the material 44 from the front end loader 36, and lowering the front end loader 36 to prepare for another loader drive cycle.

During a typical loader drive cycle, the cooling system 48, the working hydraulic system 80, and the driveline 92 all consume power provided by the engine 28 and compete for available power simultaneously. FIG. 2 shows the systems of the wheel loader 20 connected to the engine 28 and drawing power therefrom. According to the present disclosure, the controller 72 is arranged to operate the wheel loader 20 in a travel mode when the wheel loader is primarily driving over the ground and in an implement mode when the wheel loader is primarily operating an implement. In the travel mode, the controller 72 provides priority to the driveline 92 for torque demand, and in the implement mode, the controller provides priority to the working hydraulic system 80 for torque demand.

Figure 3:
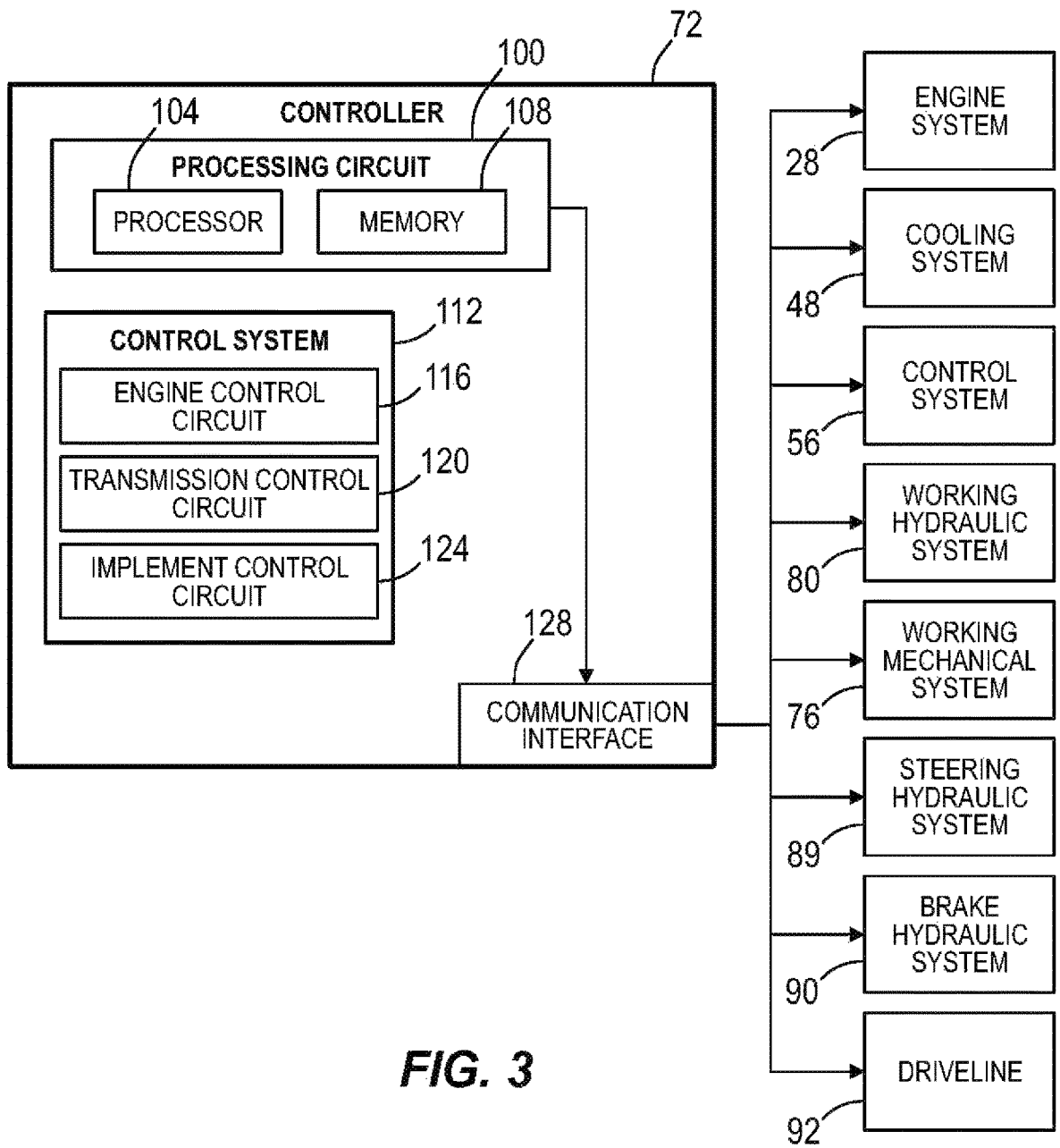
FIG. 3 is a schematic diagram of a controller of the vehicle of FIG. 1, according to an example embodiment.

As shown in FIG. 3, the controller 72 of the control system 56 can be embodied in the wheel loader 20. The controller 72 may be structured as one or more electronic control units (ECU). The controller 72 may be separate from or included with at least one of a transmission control unit, an exhaust aftertreatment control unit, a powertrain control module, an engine control module, etc. The schematic diagram of the controller 72 referred to with reference to FIG. 3 is shown according to an example embodiment. As shown in FIG. 3, the controller 72 includes a processing circuit 100 having a processor 104 and a memory device 108, a control system 112 having an engine control circuit 116, a transmission control circuit 120, and an implement control circuit 124, and a communications interface 128. Generally, the controller 72 is structured to provide prioritized operation during a travel mode and an implement mode. In the travel mode, engine speed is determined by the transmission control circuit 120 and the torque that is available to implements (e.g., the front end loader 36) is limited. In the implement mode, engine speed is determined by the engine control circuit 116 and the torque that is available for propelling or driving the wheel loader 20 (e.g., the torque consumed by a motor and pump of the transmission 96) is limited. In some embodiments, the controller 72 provides improved fuel efficiency and limits the power available to implements during travel mode operation, and provides the user with a more traditional control (e.g., pressing on the accelerator pedal will directly increase the power available to the implement) during implement mode operation.

In one configuration, the engine control circuit 116, the transmission control circuit 120, and the implement control circuit 124 are embodied as machine or computer-readable media that is executable by a processor, such as processor 104. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the engine control circuit 116, the transmission control circuit 120, and the implement control circuit 124 are embodied as hardware units, such as electronic control units. As such, the engine control circuit 116, the transmission control circuit 120, and the implement control circuit 124 may be embodied as one or more circuitry components including, but not limited to, processing circuitry, network interfaces, peripheral devices, input devices, output devices, sensors, etc. In some embodiments, the engine control circuit 116, the transmission control circuit 120, and the implement control circuit 124 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the engine control circuit 116, the transmission control circuit 120, and the implement control circuit 124 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The engine control circuit 116, the transmission control circuit 120, and the implement control circuit 124 may also include programmable hardware devices such as field programmable gate arrays, programmable array logic, programmable logic devices or the like. The engine control circuit 116, the transmission control circuit 120, and the implement control circuit 124 may include one or more memory devices for storing instructions that are executable by the processor(s) of the engine control circuit 116, the transmission control circuit 120, and the implement control circuit 124. The one or more memory devices and processor(s) may have the same definition as provided below with respect to the memory device 108 and processor 104. In some hardware unit configurations, the engine control circuit 116, the transmission control circuit 120, and the implement control circuit 124 may be geographically dispersed throughout separate locations in the vehicle. Alternatively and as shown, the engine control circuit 116, the transmission control circuit 120, and the implement control circuit 124 may be embodied in or within a single unit/housing, which is shown as the controller 72.

In the example shown, the controller 72 includes a processing circuit 100 having a processor 104 and a memory device 108. The processing circuit 100 may be structured or configured to execute or implement the instructions, commands, and/or control processes described herein with respect to the engine control circuit 116, the transmission control circuit 120, and the implement control circuit 124. The depicted configuration represents the engine control circuit 116, the transmission control circuit 120, and the implement control circuit 124 as machine or computer-readable media. However, as mentioned above, this illustration is not meant to be limiting as the present disclosure contemplates other embodiments where the engine control circuit 116, the transmission control circuit 120, and the implement control circuit 124, or at least one circuit of the engine control circuit 116, the transmission control circuit 120, and the implement control circuit 124, is configured as a hardware unit. All such combinations and variations are intended to fall within the scope of the present disclosure.

The processor 104 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the engine control circuit 116, the transmission control circuit 120, and the implement control circuit 124 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 108 (e.g., RAM, ROM, Flash Memory, hard disk storage, etc.) may store data and/or computer code for facilitating the various processes described herein. The memory device 108 may be communicably connected to the processor 104 to provide computer code or instructions to the processor 104 for executing at least some of the processes described herein. Moreover, the memory device 108 may be or include tangible, non-transient volatile memory or non-volatile memory. Accordingly, the memory device 108 may include database components, object code components, script components, or any other type of information structure for supporting the various activities and information structures described herein.

The engine control circuit 116 is structured to receive signals (e.g., data, values, information) from the control system 56 including the steering wheel 60, the accelerator pedal 64, and the joystick 68 via the communication interface 128, and provides command signals (e.g., data, values, information) to the engine 28 via the communication interface 128. In some embodiments, the engine control circuit 116 is structured to control, manage, operate, or otherwise affect operation of an ignition system, an ignition timing, an air intake system, a fueling system, or another system of the engine 28.

The transmission control circuit 120 is structured to receive signals (e.g., data, values, information) from the control system 56 including the steering wheel 60, the accelerator pedal 64, and the joystick 68 via the communication interface 128, and provides command signals (e.g., data, values, information) to the transmission 96 via the communication interface 128. In some embodiments, the transmission control circuit 120 is structured to control, manage, operate, or otherwise affect operation of the transmission 96 and/or other components of the driveline 92. For example, the transmission control circuit 120 can control the motor/pump displacement of a continuously variable transmission (CVT) thereby affecting the speed of the wheel loader 20 over the ground 42.

The implement control circuit 124 is structured to receive signals (e.g., data, values, information) from the control system 56 including the steering wheel 60, the accelerator pedal 64, and the joystick 68 via the communication interface 128, and provides command signals (e.g., data, values, information) to the working hydraulic system 80 via the communication interface 128. In some embodiments, the implement control circuit 124 is structured to control, manage, operate, or otherwise affect operation of the working hydraulic system 80 and/or the working mechanical system 76. For example, when the joystick 68 is manipulated, the implement control circuit 124 instructs the front end loader 36 to respond accordingly.

Figure 4:
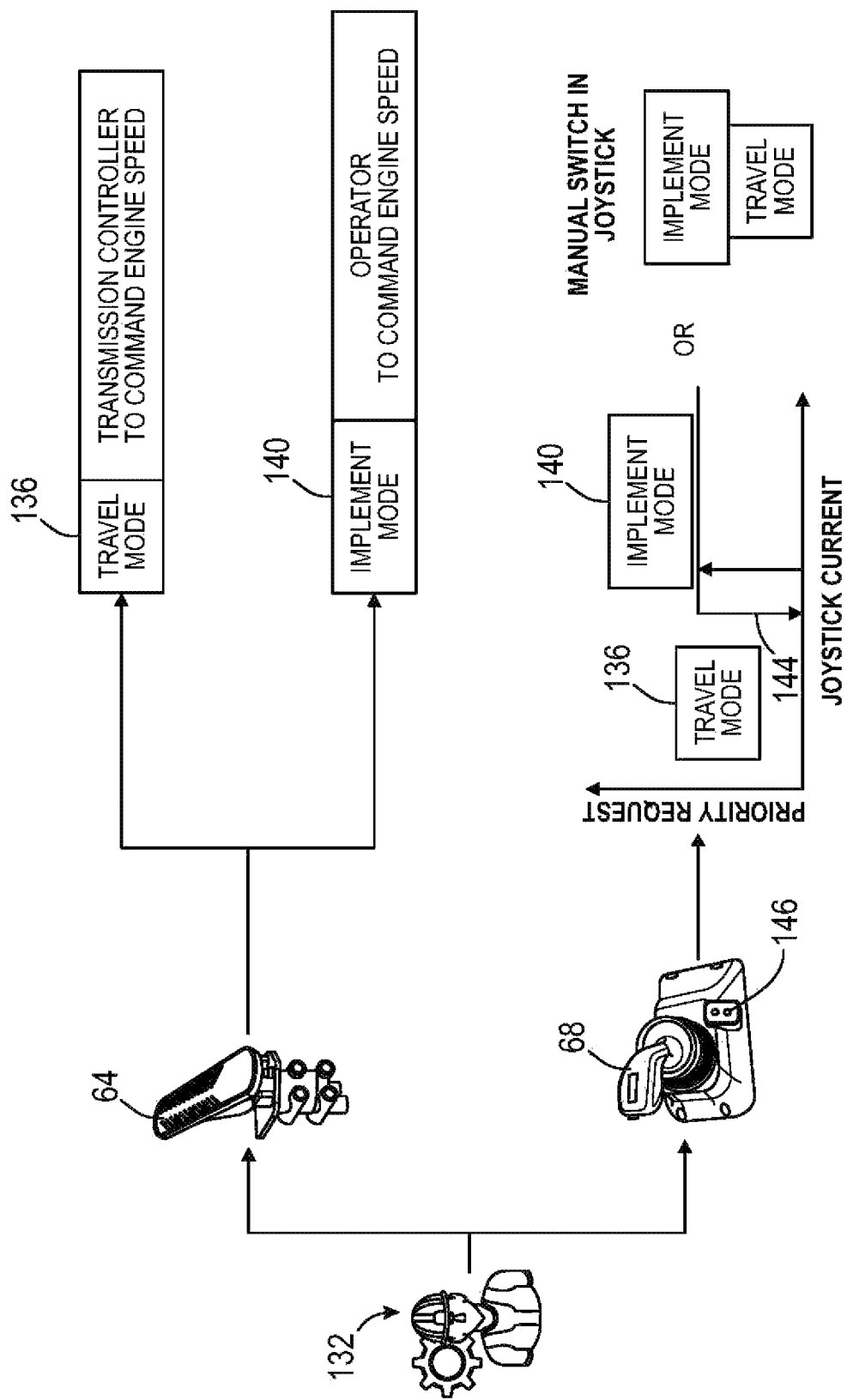
FIG. 4 is a logic flow chart showing a travel mode and an implement mode, according to an example embodiment.

As shown in FIG. 4, an operator or user 132 interacts with the control system 56 by manipulating the accelerator pedal 64 and the joystick 68. In some embodiments, the joystick 68 is used for controlling an implement (e.g., the front end loader 36) and is used to select a travel mode 136 or an implement mode 140. In some embodiments, the implement control circuit 124 recognizes a joystick signal 144 when the user 132 is manipulating the joystick 68 and causes the controller 72 to enter the implement mode 140. In some embodiments, the joystick 68 includes a switch 146 that can be manipulated by the user 132 to manually select either the travel mode 136 or the implement mode 140. In some embodiments, the controller 72 may include a limiting circuit that inhibits a user from selecting the implement mode 140. For example, the implement mode 140 may be disabled while the wheel loader 20 is on a roadway, or if the wheel loader is travelling at or above a threshold speed.

Figure 5:
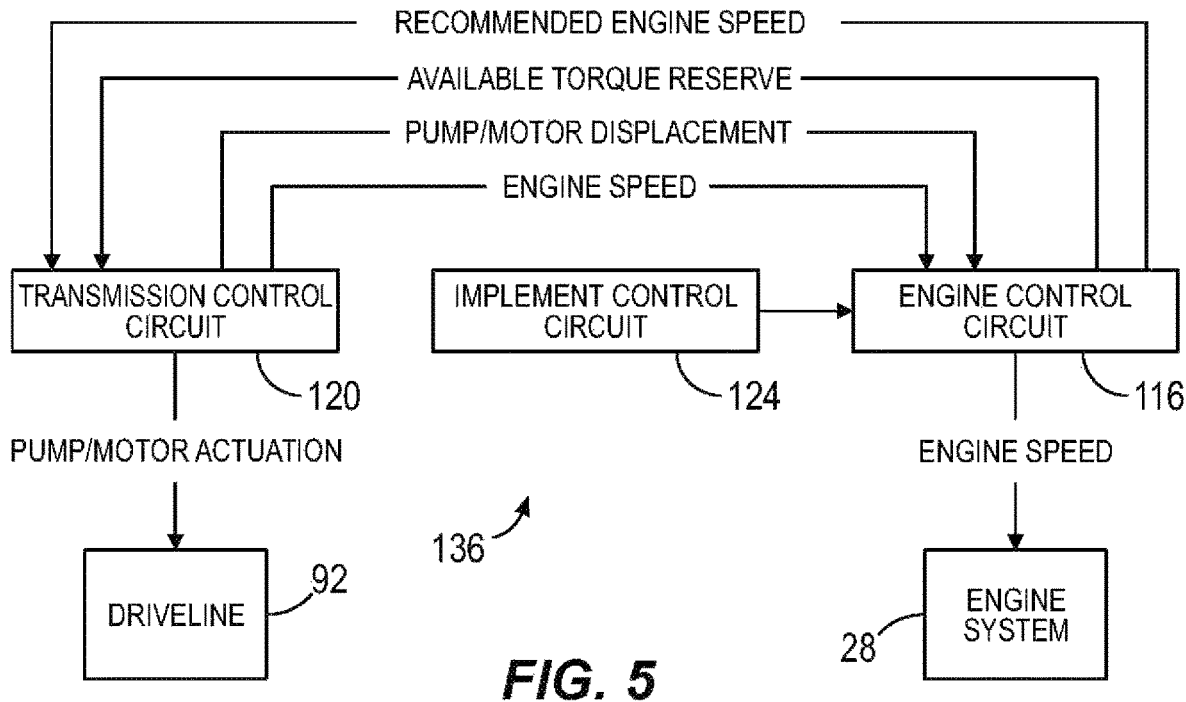
FIG. 5 is a logic flow chart showing operation in the travel mode, according to an example embodiment.

As shown in FIG. 5, while operating in the travel mode 136, the engine control circuit 116 receives an input (if any) from the implement control circuit 124 and provides a recommended engine speed and an available torque reserve to the transmission control circuit 120. The transmission control circuit 120 receives the recommended engine speed and the available torque reserve from the engine control circuit 116, and determines a pump/motor displacement and an engine speed that are then provided back to the engine control circuit 116. The engine control circuit 116 then utilizes the engine speed determined by the transmission control circuit 120 and operates the engine 28 accordingly. The transmission control circuit 120 then controls the transmission 96 (e.g., the pump/motor of a CVT) of the driveline 92. In the travel mode 136, priority is given to propulsion torque and the transmission 96 may be operated for maximum fuel efficiency. In some embodiments, if the user 132 operates an implement of the wheel loader 20 (e.g., the front end loader 36) while operating in the travel mode 136, the controller 72 provides torque to the working hydraulic system 80 only after any required propulsion torque has been provided. In some embodiments, if the user 132 operates an implement of the wheel loader 20 while operating in the travel mode 136, the controller 72 will limit the implement torque in order to meet or substantially meet the desired propulsion torque.

Figure 6:
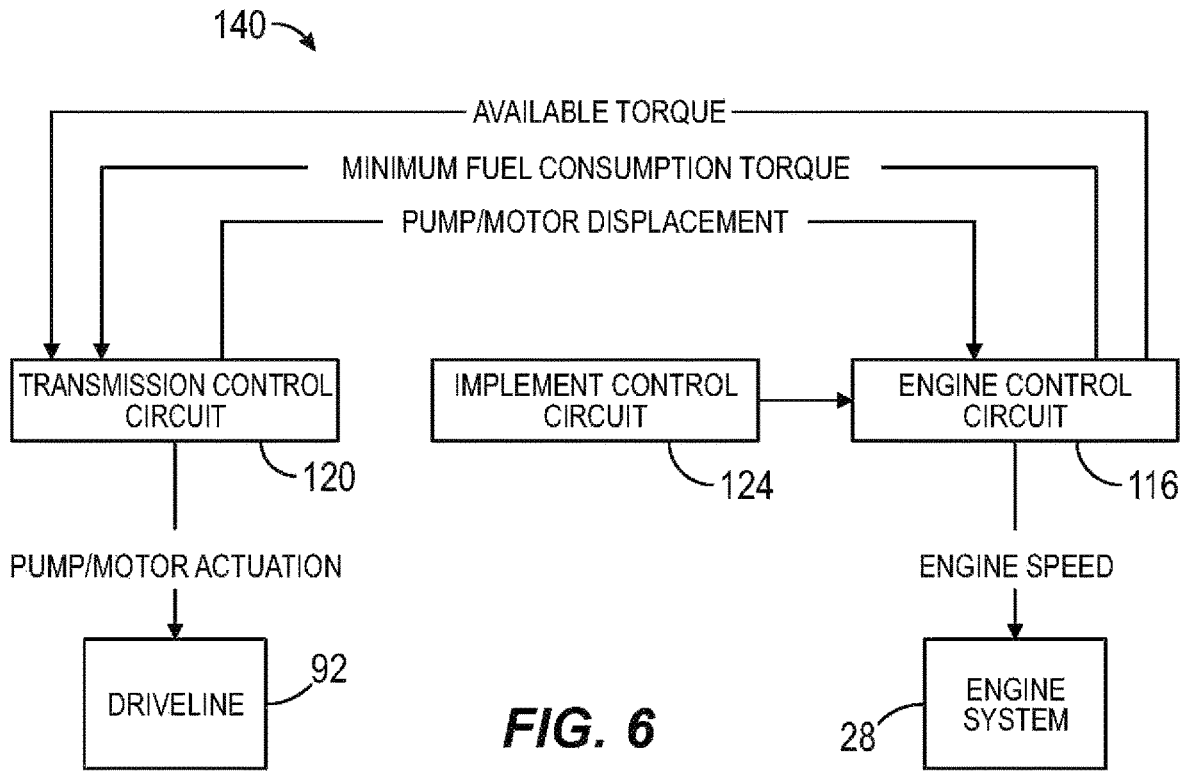
FIG. 6 is a logic flow chart showing operation in the implement mode, according to an example embodiment.

As shown in FIG. 6, while operating in the implement mode 140, the engine control circuit 116 and the transmission control circuit 120 receive inputs from the implement control circuit 124. The engine control circuit 116 provides an available torque and a minimum fuel consumption (best efficiency) torque to the transmission control circuit 120. The minimum fuel consumption (best efficiency) torque represents a value of torque that the engine 28 can provide while operating at a maximum fuel efficiency. The transmission control circuit 120 determines a required pump/motor displacement of the driveline 92 including the transmission 96 and provides a pump/motor displacement signal (e.g., instruction, data, values, information) to the engine control circuit 116. The engine control circuit 116 then determines an engine speed based on the inputs from the implement control circuit 124 (e.g., the needs of the working hydraulic system 80) and the communication pump/motor displacement from the transmission control circuit 120. The engine 28 is then controlled to the engine speed determined by the engine control circuit 116. In the implement mode 140, priority is given to implement torque and the user 132 more directly impacts the engine speed by manipulating the accelerator pedal 64. In other words, the implement mode 140 provides the user 132 with the ability to speed up or slow down the speed of the engine 28 manually to meet the demands of the implements (e.g., the front end loader 36) while operating in the implement mode 140. In some embodiments, if the user 132 moves the wheel loader 20 (e.g., the front end loader 36) while operating in the implement mode 140, the controller 72 will provide propulsion torque to the driveline 92 only after any required implement torque has been provided. In some embodiments, if the user 132 moves the wheel loader 20 while operating in the implement mode 140, the controller 72 will limit the propulsion torque in order to meet the desired implement torque.

Figure 7:
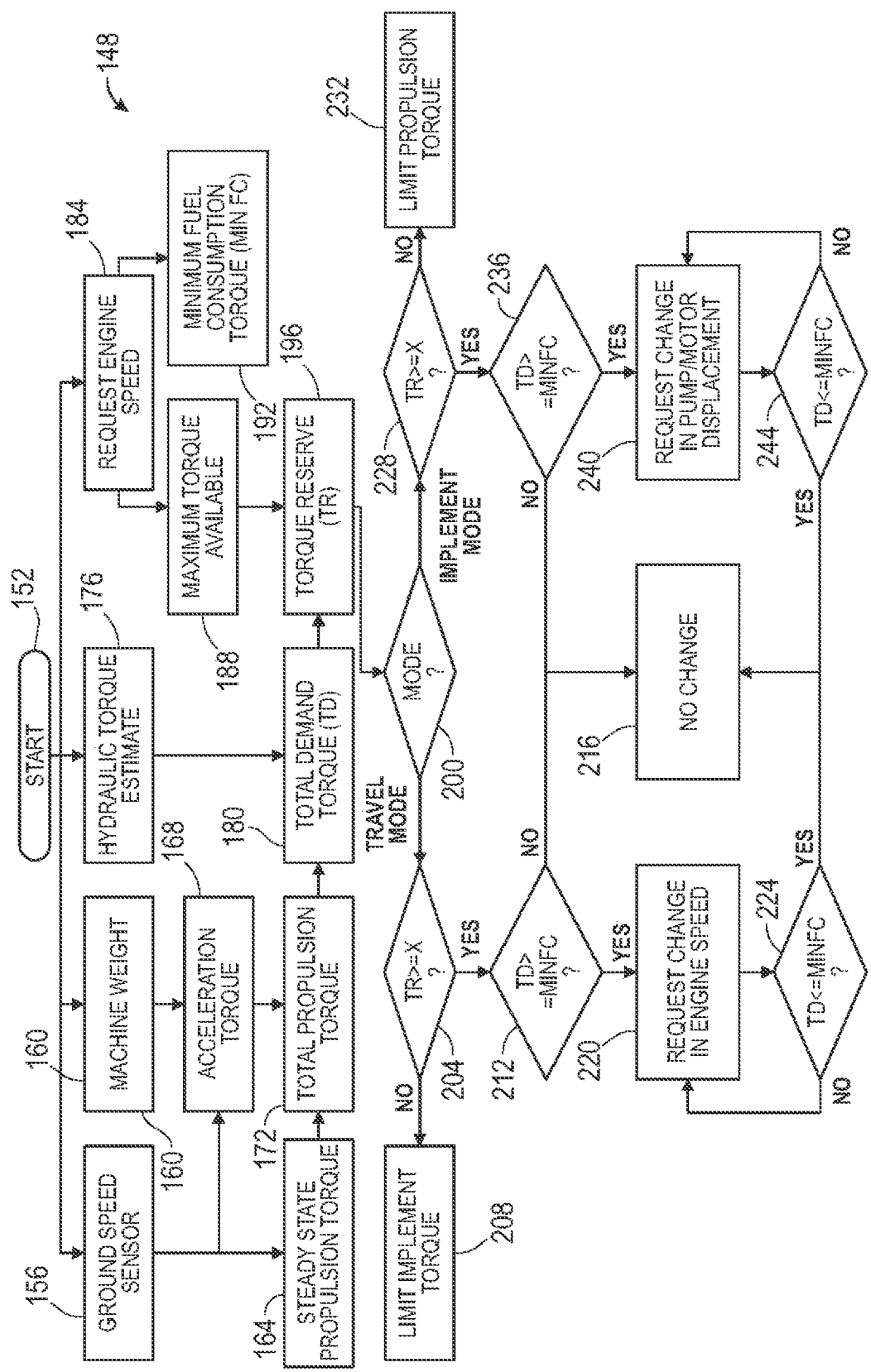
FIG. 7 is a logic flow chart showing operation of the vehicle of FIG. 1, according to an example embodiment.

A method 148 of operating the wheel loader 20 is shown in FIG. 7. At a start 152 of the method 148, the transmission control circuit 120 determines a ground speed of the wheel loader 20 based on input received from a ground speed sensor at step 156, and determines a machine weight of the wheel loader 20 based on input received from strain gauges, other sensors, and/or manual input at step 160. The ground speed and machine weight can be determined based on information received from virtual sensors, or other calculations that are based on values determined by other vehicle systems, within the controller 72, or by another controller. The transmission control circuit 120 then determines a steady state torque estimate to maintain the current speed at step 164, and an acceleration torque estimate to accelerate or decelerate in response to a request from the user 132 (e.g., pressing the accelerator pedal or a brake pedal) at step 168. At step 172, the transmission control circuit 120 determines a total propulsion torque estimate based on the determined steady state propulsion torque estimate and the acceleration torque estimate.

At step 176, the implement control circuit 124 determines an implement torque or a hydraulic torque estimate based on feedback from the working hydraulic system 80. The controller 72 then determines a total torque demand (TD) at step 180 based on the hydraulic torque estimate and the total propulsion torque estimate. Previous steps are included to estimate or predict steady state engine torque (e.g., a sum of propulsion and implement hydraulic torque). Alternatively, total torque demand can be current torque demand on engine.

At step 184, the engine control circuit 116 receives an engine speed request (e.g., to increase or decrease the engine speed) from the user 132 (e.g., from the accelerator pedal 64 or the joystick 68). At step 188, the engine control circuit 116 determines a maximum torque available from the engine 28 and at step 192 the engine control circuit 116 determines a minimum fuel consumption (best efficiency) torque (minFC). The engine control circuit 116 then determines an available torque reserve (TR) based on the total torque demand (TD) and the maximum torque available, at step 196.

At step 200, the controller 72 determines if the travel mode 136 or the implement mode 140 is active. If the travel mode 136 is active, then the method 148 proceeds to step 204 and the torque reserve (TR) is compared to a predetermined threshold (X) to determine if the engine 28 can produce enough torque to operate the wheel loader 20 without limiting any systems. If the torque reserve (TR) is less than or equal to the predetermined threshold (X), then the implement control circuit 124 will actively limit the implement torque used by the working hydraulic system 80 at step 208. If the controller 72 determines at step 204 that the torque reserve (TR) is greater than or equal to the predetermined threshold (X), then the method 148 continues to step 212 and the total torque demand (TD) is compared to the minimum fuel consumption (best efficiency) torque (minFC). If the total torque demand (TD) is less than or equal to the minimum fuel consumption (best efficiency) torque (minFC), then the transmission control circuit 120 makes no demand for a speed change at step 216. If the total torque demand (TD) is greater than or equal to the minimum fuel consumption (best efficiency) torque (minFC), then the transmission control circuit 120 communicates with the engine control circuit 116 to reduce the engine speed at step 220. At step 224, the transmission control circuit 120 determines if the total torque demand (TD) is less than or equal to the minimum fuel consumption (best efficiency) torque (minFC). If not, then the method 148 returns to step 220 and the transmission control circuit 120 again requests a decrease in the engine speed. Steps 220 and 224 are repeated iteratively until the total torque demand (TD) is less than or equal to the minimum fuel consumption (best efficiency) torque (minFC), then no further change is requested and the method proceeds to step 216.

If at step 200, the implement mode 140 is active, then the method 148 proceeds to step 228 and the torque reserve (TR) is compared to the predetermined threshold (X). If the torque reserve (TR) is less than or equal to the predetermined threshold (X), then the transmission control circuit 120 will actively limit the propulsion torque used by the driveline 92 at step 232. If the controller 72 determines at step 228 that the torque reserve (TR) is greater than or equal to the predetermined threshold (X), then the method 148 continues to step 236 and the total torque demand (TD) is compared to the minimum fuel consumption (best efficiency) torque (minFC). If the total torque demand (TD) is less than or equal to the minimum fuel consumption (best efficiency) torque (minFC), then the engine control circuit 116 makes no demand for a speed change at step 216. If the total torque demand (TD) is greater than or equal to the minimum fuel consumption (best efficiency) torque (minFC), then the engine control circuit 116 determines a reduces engine speed at step 240. At step 244, the implement control circuit 124 determines if the total torque demand (TD) is less than or equal to the minimum fuel consumption (best efficiency) torque (minFC). If not, then the method 148 returns to step 240 and the engine control circuit 116 again requests a decrease in the engine speed. Steps 240 and 244 are repeated iteratively until the total torque demand (TD) is less than or equal to the minimum fuel consumption (best efficiency) torque (minFC), then no further change is requested and the method proceeds to step 216.

The method 148 reduces the incidence of engine stalling by limiting either the propulsion torque or the implement torque and provides increased operator 132 control while in the implement mode 140. The working modes (i.e., the travel mode 136 and the implement mode 140) provide a priority operation. In the travel mode 136, propulsion torque is prioritized, and in the implement mode 140, implement torque is prioritized.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIG. 3, it should be understood that the controller 72 may include any number of circuits for completing the functions described herein. For example, the activities and functionalities of the circuits 116, 120, 124 may be combined in multiple circuits or as a single circuit. Additional circuits with additional functionality may also be included. Further, the controller 72 may further control other activity beyond the scope of the present disclosure.

As mentioned above and in one configuration, the "circuits" may be implemented in machine-readable medium for execution by various types of processors, such as processor 104 of FIG. 3. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus of a vehicle, comprising:
an engine control circuit structured to control an engine speed;
a transmission control circuit structured to control an operating parameter of a transmission;
an implement control circuit structured to control an implement; and
a processing circuit structured to receive one of a travel signal indicative of a travel mode for the vehicle and an implement signal indicative of an implement mode for the vehicle,
in response to receiving the travel signal indicative of operating in the travel mode, the transmission control circuit is structured to determine the engine speed and the implement control circuit limits an implement torque to maintain the engine speed; and
in response to receiving the implement signal indicative of operating in the implement mode, the engine control circuit is structured to determine the engine speed and the transmission control circuit limits a propulsion torque to maintain the engine speed.

2. The apparatus of claim 1, wherein the engine control circuit is structured to determine a torque reserve, and
wherein the processing circuit is structured to compare the torque reserve to a torque reserve threshold,
in response to the torque reserve being less than or equal to the torque reserve threshold and the vehicle operating in the travel mode, the implement control circuit limits the implement torque, and
in response to the torque reserve being less than or equal to the torque reserve threshold and the vehicle operating in the implement mode, the transmission control circuit limits the propulsion torque.

3. The apparatus of claim 1, wherein the engine control circuit is structured to determine a minimum fuel consumption torque, and
wherein the processing circuit is structured to determine a total torque demand and to compare the total torque demand to the minimum fuel consumption torque,
in response to the total torque demand being greater than or equal to the minimum fuel consumption torque and the vehicle operating in the travel mode, the transmission control unit is structured to change the engine speed, and
in response to the total torque demand being greater than or equal to the minimum fuel consumption torque and the vehicle operating in the implement mode, the transmission control circuit is structured to change a transmission arrangement.

4. The apparatus of claim 1, wherein the transmission control circuit is structured to control a pump and a motor,
wherein the transmission is a continuously variable transmission, and
wherein the implement is a front end loader of the vehicle.

5. The apparatus of claim 1, wherein the implement control circuit is structured to receive information from a user operated accelerator pedal of the vehicle, and
wherein the engine speed is dependent on the information received from the user operated accelerator pedal in the implement mode.

6. The apparatus of claim 1, wherein the implement includes a working hydraulic system and the implement control circuit is structured to control at least one of a motor and a pump of the working hydraulic system.

7. The apparatus of claim 1, further comprising a manually operated switch movable between an implement mode position and a travel mode position.

8. The apparatus of claim 1, wherein the processing circuit automatically selects the travel mode or the implement mode based on receipt of the travel signal or the implement signal.

9. The apparatus of claim 8, wherein the implement signal is automatically sent when a user interacts with a joystick.

10. The apparatus of claim 1, further comprising a limiting circuit structured to inhibit use of the implement mode.

11. The apparatus of claim 10, wherein the limiting circuit is structured to inhibit use of the implement mode when the vehicle is located on a roadway or travelling above a threshold speed.

12. An apparatus of a vehicle, comprising:
a processing circuit comprising at least one processor coupled to at least one non-transitory memory device, the processing circuit structured to:
  determine a torque reserve;
  receive one of a travel signal indicative of a travel mode for the vehicle and an implement signal indicative of an implement mode for the vehicle;
  prioritize propulsion torque over implement torque when the travel signal is received by limiting implement torque when the torque reserve is less than or equal to a predetermined threshold; and
  prioritize implement torque over propulsion torque when the implement signal is received by limiting propulsion torque when the torque reserve is less than or equal to an implement torque predetermined threshold.

13. The apparatus of claim 12, wherein the implement signal is automatically sent when a user interacts with an implement of the vehicle.

14. The apparatus of claim 12, further comprising a working hydraulic system and a continuously variable transmission,
  wherein the processing circuit limits the power consumed by the working hydraulic system when the travel signal is received, and
  wherein the processing circuit limits the power consumed by the continuously variable transmission when the implement signal is received.

15. The apparatus of claim 12, wherein the processing circuit is further structured to:
  determine a total propulsion torque estimate;
  determine a hydraulic torque estimate;
  determine a torque demand based at least in part on the total propulsion torque estimate and the hydraulic torque estimate; and
  determine a minimum fuel consumption torque.

16. The apparatus of claim 15, wherein when the travel signal is received, the processing circuit is structured to decrease an engine speed when the torque demand is greater than or equal to the minimum fuel consumption torque, and
  wherein when the implement signal is received, the processing circuit is structured to decrease a requested pump and motor displacement of a working hydraulic system when the torque demand is greater than or equal to the minimum fuel consumption torque.

17. The apparatus of claim 12, wherein when the travel signal is received, the processing circuit is structured to decrease an engine speed until a torque demand is less than or equal to a minimum fuel consumption torque, and
  wherein when the implement signal is received, the processing circuit is structured to decrease a requested pump and motor displacement of a working hydraulic system until the torque demand is less than or equal to the minimum fuel consumption torque.

18. The apparatus of claim 12, further comprising a limiting circuit structured to inhibit use of the implement mode.

19. The apparatus of claim 18, wherein the limiting circuit is structured to inhibit use of the implement mode when the vehicle is located on a roadway or travelling above a threshold speed.

20. A method, comprising:
  determining a total propulsion torque estimate;
  determining a hydraulic torque estimate;
  determining a torque demand based at least in part on the total propulsion torque estimate and the hydraulic torque estimate;
  determining a torque reserve;
  receiving a travel signal indicative of a travel mode for a vehicle;
  receiving an implement signal indicative of an implement mode for the vehicle;
  prioritizing propulsion torque over implement torque when the travel signal is received by limiting implement torque when the torque reserve is less than or equal to a travel predetermined threshold;
  prioritizing implement torque over propulsion torque when the implement signal is received by limiting propulsion torque when the torque reserve is less than or equal to an implement predetermined threshold;
  decreasing an engine speed when the torque demand is greater than or equal to a minimum fuel consumption torque and the travel signal has been received; and
  decreasing a requested pump and motor displacement of a working hydraulic system when the torque demand is greater than or equal to the minimum fuel consumption torque and the implement signal has been received.

* * * * *